(12) United States Patent
Chakraborty et al.

(10) Patent No.: US 10,728,137 B1
(45) Date of Patent: Jul. 28, 2020

(54) PROTOCOL INDEPENDENT MULTICAST ("PIM") FAULT TOLERANT DESIGNATED ROUTER ("DR") ELECTION

(71) Applicant: Juniper Networks, Inc., Sunnyvale, CA (US)

(72) Inventors: Abhishek Chakraborty, Bangalore (IN); Abhishek Asthana, Bangalore (IN); Jagathpathi Dasararaju, Sunnyvale, CA (US); Joya Neema, Bangalore (IN); Rajesh Shetty Manur, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 43 days.

(21) Appl. No.: 16/147,008

(22) Filed: Sep. 28, 2018

(51) Int. Cl.
 *H04L 12/751* (2013.01)
 *H04L 12/761* (2013.01)

(52) U.S. Cl.
 CPC .............. *H04L 45/02* (2013.01); *H04L 45/16* (2013.01)

(58) Field of Classification Search
 None
 See application file for complete search history.

(56) References Cited

U.S. PATENT DOCUMENTS

| 8,121,025 | B2 | 2/2012 | Duan et al. | |
|---|---|---|---|---|
| 2009/0161670 | A1* | 6/2009 | Shepherd | H04L 12/185 370/389 |
| 2011/0075572 | A1* | 3/2011 | Serbest | H04L 12/1868 370/248 |
| 2018/0205638 | A1* | 7/2018 | Xu | H04L 45/28 |
| 2019/0215264 | A1* | 7/2019 | Nandy | H04L 45/60 |

OTHER PUBLICATIONS

B. Fenner, et al, "Protocol Independent Multicast-Sparse Mode (PIM-SM): Protocol Specification (Revised)", *Request for Comments: 4601*, pp. 1-112, (Network Working Group of the Internet Engineering Task Force, Aug. 2006).

* cited by examiner

*Primary Examiner* — Huy D Vu
*Assistant Examiner* — Bao G Nguyen
(74) *Attorney, Agent, or Firm* — John C. Pokotylo; Pokotylo Patent Services

(57) ABSTRACT

The potential problem of traffic loss during a period when a second PIM router is elected DR after a first PIM router (on the same PIM interface) was previously elected DR and is transiting multicast traffic, is solved by (1) configuring a first interval on a PIM interface for at least the first PIM router; (2) responsive to the PIM interface of the first PIM router booting up, (i) starting, by the first PIM router, a timer corresponding to the configured first interval, (ii) determining, by the first PIM router, whether or not it is the DR on the PIM interface, (iii) upon determining that the timer has expired, redetermining, by the first PIM router, whether or not it is the DR on the PIM interface, and (iv) responsive to a redetermination that the first PIM router is the DR on the PIM interface, (A) increasing, by the first PIM router, a DR priority value of the first PIM router to reduce a likelihood that another of the at least two PIM routers will replace the first PIM router as DR, and (B) sending on the PIM interface, by the first PIM router, a PIM HELLO message including the increased DR priority value.

19 Claims, 9 Drawing Sheets

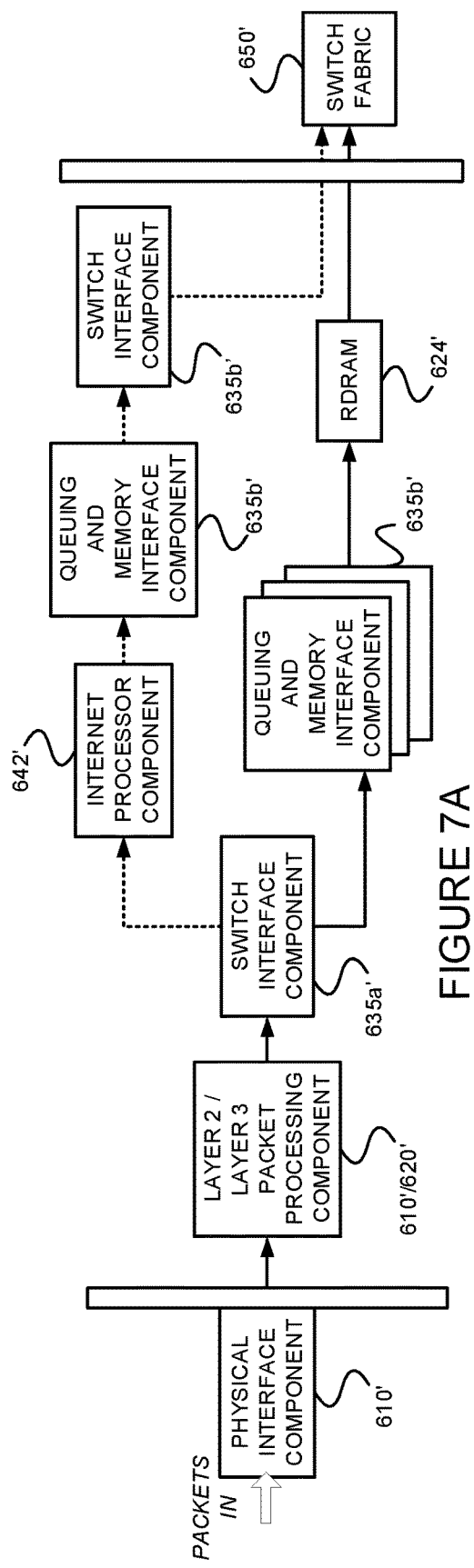
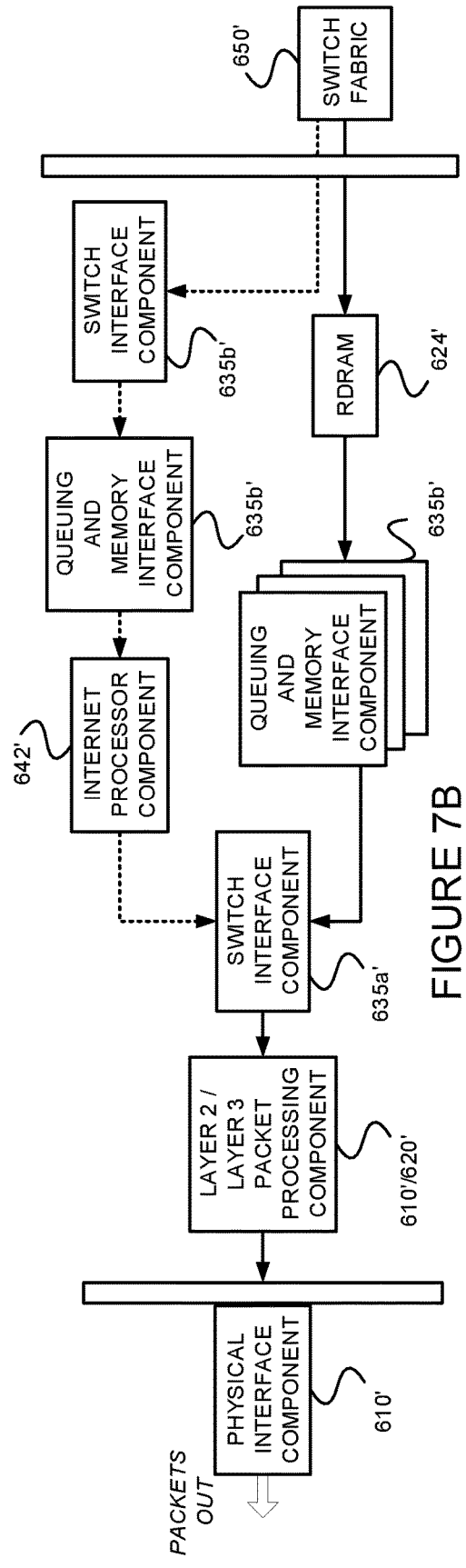

PROTOCOL INDEPENDENT MULTICAST ("PIM") FAULT TOLERANT DESIGNATED ROUTER ("DR") ELECTION

1. BACKGROUND OF THE INVENTION

1.1 Field of the Invention

The present description concerns communications networks. In particular, the present description concerns election of a designated router ("DR") in a communications network employing a multicast protocol, such as that described in "Protocol Independent Multicast-Sparse Mode (PIM-SM): Protocol Specification (Revised)," Request for Comments 4601 (August 2006, The Internet Engineering Task Force) (incorporated herein by reference and referred to as "RFC 4610" of the "IETF").

1.2 Background Information

In accordance with section 4.3.2 of RFC 4601, DR election between two (2) PIM routers on an interface "I" will be decided based on a comparison of DR priority values and, in the event of a tied DR priority, a PIM neighbor's Internet protocol ("IP") address. More specifically, the PIM router with highest priority for interface "I" will be chosen as DR. If priority values are same for both PIM routers on a given interface "I," then the PIM neighbor having highest IP address on interface "I" wins the election. For any PIM interface coming up on a LAN, all the other PIM routers, including the new PIM router, have to undergo PIM DR election again and a new DR may be chosen based on the election.

Unfortunately, the DR election procedure under section 4.3.2 of RFC 4601 can lead to unnecessary traffic loss in certain scenarios. Consider a LAN in which DR election has already occurred and a first PIM router is elected as a forwarding DR. If a new PIM router comes up on the LAN and wins the DR re-election, the new PIM router will take over the DR role immediately even before it is ready to forward the multicast traffic (i.e., even before it receives an Internet Group Management Protocol ("IGMP") join from the host IGMP receiver) and pulls traffic from the upstream router even though it is unable to forward such traffic and even though the original DR could have otherwise continued to forward such traffic.

More specifically, consider the example network topology 100 of FIG. 1. PIM router 1 110*a* and PIM router 2 110*b* are both connected on LAN 120, via interfaces 115*a* and 115*b* (e.g., ge-0/0/1.0), respectively, with an IGMP receiver (host) 140. Assume that the IP address of interface 115*a* of PIM router 1 110*a* is 10.1.1.1/24, while the IP address of interface 115*b* of PIM router 2 110*b* is 10.1.1.2/24. According to section 4.3.2 of RFC 4601 (PIM DR election), either PIM router 1 110*a* or PIM router 2 110*b* is elected as the DR on LAN 120 (e.g., on interface ge-0/0/1.0). Only the elected DR router will be responsible for sending the PIM joins upstream. In this example, assume that there is no DR priority configured explicitly on the PIM interfaces 115*a* and 115*b*. Per section 4.3.2 of RFC 4601, when both PIM router 1 110*a* and PIM router 2 110*b* have a default DR priority (that is, a tied DR priority), the DR will be elected based on IP address. In this case, PIM router 2 110*b* wins DR election.

Referring now to FIG. 2A, consider a scenario 200*a* where PIM router 1 110*a* and PIM router 2 110*b* are booting up initially. Suppose PIM router 1 110*a* comes up first and enables PIM interface ge-0/0/1.0 115a on the LAN 120. PIM router 1 110*a* declares itself as PIM DR on interface ge-0/0/1.0 as there are no other PIM neighbors on this LAN 120. PIM router 1 110*a* sends out an IGMP query 210 on which IGMP receiver (host) 140 on the LAN 120 responds with IGMP group membership report 220. On receiving this IGMP report 220, PIM router 1 110*a* checks its DR state on interface ge-0/0/1.0 and sends a PIM join 230 to upstream source router 130 to pull the traffic thus creating multicast route when traffic 240 hits PIM router 1 110*a*. At this time, multicast traffic 240 is seamlessly flowing from source router 130 to PIM router 1 110*a*, and then from PIM router 1 110*a* to IGMP receiver (host) 140.

Referring now to FIG. 2B, suppose at this later time that PIM router 2 110*b* comes up on the LAN 120, enabling PIM on interface ge-0/0/1.0 115b. PIM router 2 110*b* sends out a HELLO message (not shown) on the LAN 120 in order to advertise itself. Responsive to receiving this HELLO from PIM router 2 110*b*, PIM router 1 110*b* adds this PIM neighbor and starts DR election. (Note that PIM router 2 110*b* will similarly run DR election.) PIM router 2 110*b* wins this DR election due to its higher IP address (10.1.1.2/24>10.1.1.1/24). (Recall that priority for the interface is set to a default value for each of the PIM routers 110*a* and 110*b*.) Responsive to losing the DR election, PIM router 1 110*a* immediately transitions from DR to non-DR, thereby pruning all PIM joins to the upstream source router 130 even before PIM router 2 110*b* is ready to forward the traffic (i.e., even before PIM router 2 110*b* sends out an IGMP query 250 on which IGMP receiver (host) 140 on the LAN 120 responds with IGMP group membership report 260 to create its PIM states and form a new multicast route from the source router 130 to it 110*b*, and then from it 110*b* to the IGMP receiver (host) 140).

Unfortunately, multicast traffic will be lost from the time PIM router 1 110*a* prunes its PIM joins, until PIM router 2 110*b* starts pulling traffic from upstream source router 130. Such traffic loss can also occur anytime a higher DR priority router (or in the event of a tie, any time a router with a higher IP address on the PIM interface) comes up second on the LAN, when lower DR priority router (or in the event of a tie, any time a router with a lower IP address on the PIM interface) is already forwarding traffic. Such traffic loss can be very critical, for example in a network in which emergency calls are exchanged. Thus, it would be useful to prevent such traffic losses.

2. SUMMARY OF THE INVENTION

The potential problem of traffic loss during a period when a second PIM router is elected DR after a first PIM router (on the same PIM interface) was previously elected DR and is transiting multicast traffic, is solved by (1) configuring a first interval on a PIM interface for at least the first PIM router; (2) responsive to the PIM interface of the first PIM router booting up, (i) starting, by the first PIM router, a timer corresponding to the configured first interval, (ii) determining, by the first PIM router, whether or not it is the DR on the PIM interface, (iii) upon determining that the timer has expired, redetermining, by the first PIM router, whether or not it is the DR on the PIM interface, and (iv) responsive to a redetermination that the first PIM router is the DR on the PIM interface, (A) increasing, by the first PIM router, a DR priority value of the first PIM router to reduce a likelihood that another of the at least two PIM routers will replace the first PIM router as DR, and (B) sending on the PIM interface, by the first PIM router, a PIM HELLO message including the increased DR priority value.

3. BRIEF DESCRIPTION OF THE DRAWINGS

FIGS. 7A and 7B illustrate example packet forwarding operations of the example distributed ASICs of FIG. 6.

4. DETAILED DESCRIPTION

The present description may involve novel methods, apparatus, message formats, and/or data structures for avoiding potential traffic loss during a period when a second PIM router is elected DR after a first PIM router (on the same PIM interface) was previously elected DR and is transiting multicast traffic. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

4.1 EXAMPLE ENVIRONMENT

Figure 1:
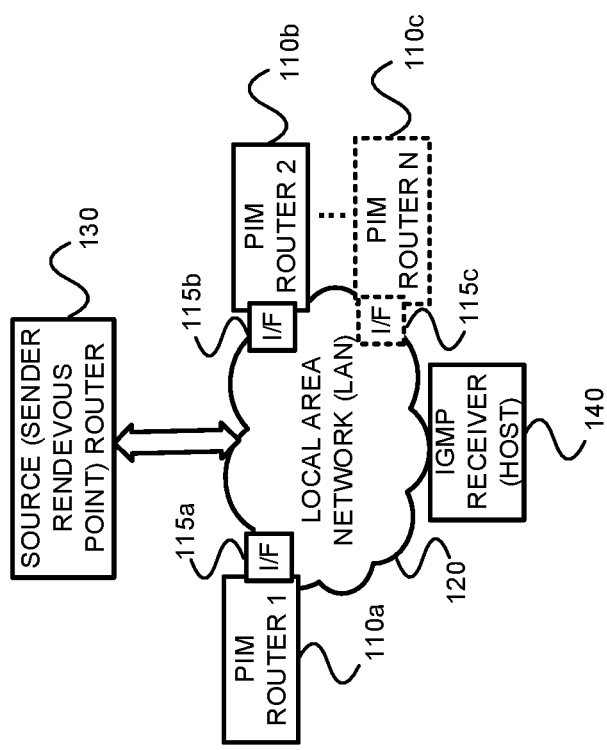
FIG. 1 is an example environment in which example embodiments consistent with the present description may be used.

The described methods and apparatus may be used in an example environment such as the example network topology 100 of FIG. 1. In the example environment, at least two PIM routers (e.g., PIM router 1 110a, PIM router 2 110b, . . . PIM router N 110c) are connected on LAN 120, via interfaces 115a, 115b, . . . 115c (e.g., ge-0/0/1.0), respectively, with an IGMP receiver (host) 140. An upstream source (e.g., sender rendezvous point) router 130 will forward multicast traffic to the IGMP receiver host 140 via the one of the PIM routers 110a, 110b, or 110c that was elected DR.

4.2 EXAMPLE METHODS

Figure 3:
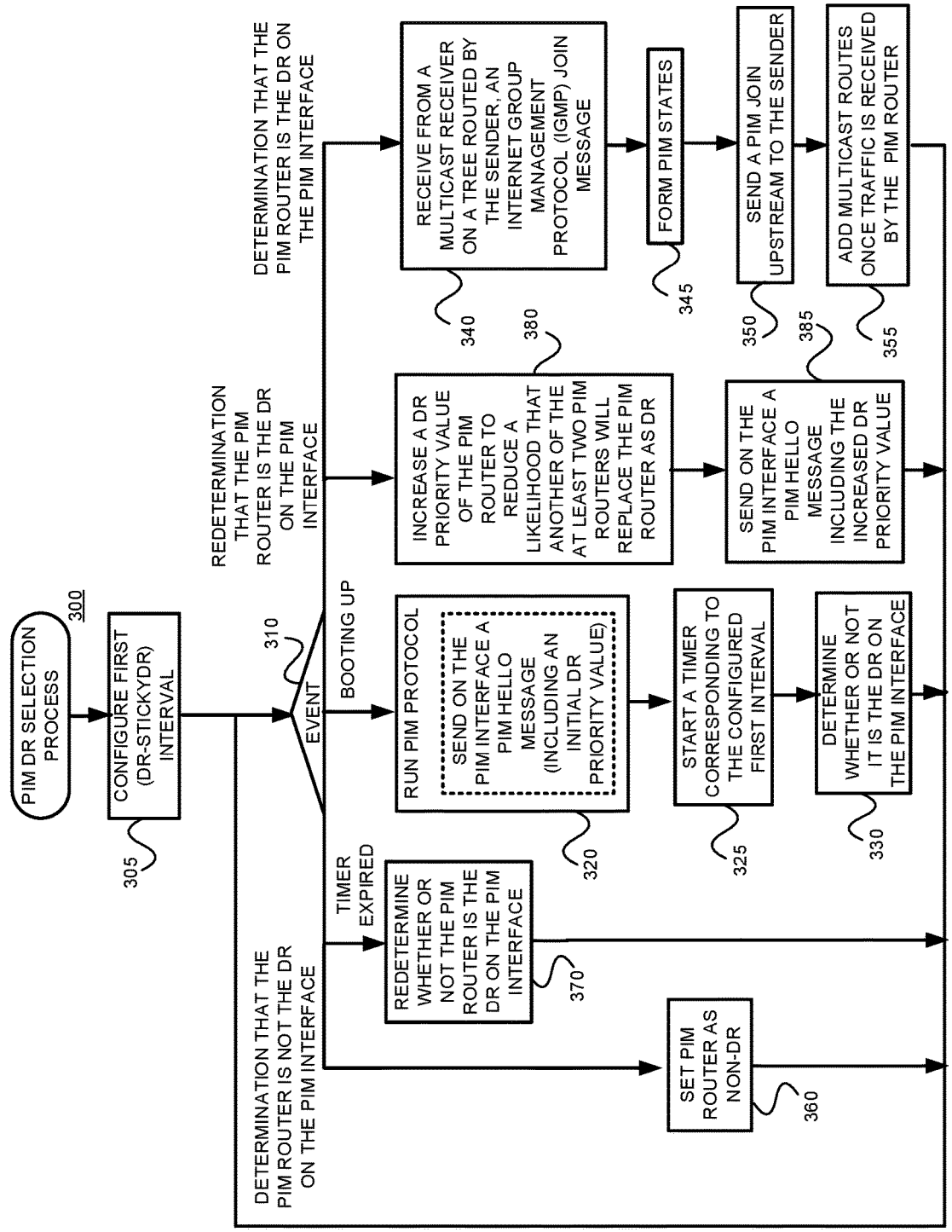
FIG. 3 is a flow diagram of an example method for selecting a PIM DR in a manner consistent with the present description.

FIG. 3 is a flow diagram of an example method 300 for performing PIM DR selection in a manner consistent with the present description, of one of at least two protocol independent multicast (PIM) routers provided on a multi-access local area network (LAN) between a sender rendezvous point (RP) router (also referred to as a "source router") and a multicast receiver (also referred to as an "IGMP receiver (host)"). This example method 300 may be run on one or more of the PIM routers, but is preferably run on all of the PIM routers. As shown, a first interval is configured on a PIM interface for the PIM router. (Block 305)

Various branches of the example method 300 are then performed responsive to the occurrence of various events. (Event triggered branch 310) For example, when the PIM router boots up, it runs a PIM protocol (e.g., as specified in RFC 4601). For example, the PIM router may send a PIM hello message (e.g., including its originally configured DR value) to any other PIM routers on the LAN sharing the PIM interface. (Block 320) The PIM router may then start a timer corresponding to the earlier configured first interval. (Block 325) and determine whether or not it is the DR on the PIM interface (Block 330). This determination may be made in accordance with section 4.3.2 of RFC 4601.

Referring back to Event triggered branch 310, responsive to a determination that the PIM router is the DR of the PIM interface, the method 300 may receive from a multicast receiver on a tree routed by the sender, an Internet Group Management Protocol (IGMP) join message (Block 340), form PIM states (Block 345), send a PIM join upstream to the source (sender rendezvous point) router (Block 350), and add multicast routes once traffic is received by the PIM router (Block 355).

Referring back to Event triggered branch 310, upon determining that the timer has expired, the example method 300 redetermine whether or not it is (still) the DR on the PIM interface. (Block 370) Referring back to Event triggered branch 310, responsive to a redetermination that the PIM router is the DR on the PIM interface, the example method 300 increases a DR priority value of the first PIM router to reduce a likelihood that another of the at least two PIM routers will replace the first PIM router as DR (Block 380) and sends on the PIM interface, a PIM HELLO message including the increased DR priority value (Block 385).

Recall that the example method 300 may be run on a first PIM router, and may also be run on a second PIM router. Alternatively, the second PIM router can simply run a PIM protocol such as RFC 4601, without the modifications of the method 300. In either case, assume that a PIM interface of a second PIM router boots up. In response, the second PIM router will determine whether or not it is the DR on the PIM interface. (Recall, e.g., block 330.)

If the second PIM router boots up before the timer in the first PIM router has expired, when the second PIM router determines whether or not it is the DR on the PIM interface, it uses at least one of (A) its DR priority information, and (B) its Internet address (e.g., per RFC 4601). Responsive to a determination by the second PIM router that it is the DR on the PIM interface, it will send on the PIM interface, a PIM HELLO message indicating that the second PIM router is selected as the DR on the PIM interface (e.g., per RFC 4601). Otherwise, responsive to a determination by the second PIM router that it is not the DR on the PIM interface, it will send a PIM HELLO message indicating that the second PIM router is a non-DR on the PIM interface (e.g., per RFC 4601).

If, on the other hand, the second PIM router boots up after the timer in the first PIM router has expired and the after the first PIM router has sent a PIM HELLO message including the increased DR priority value (Recall, e.g., Block 385), the second PIM router will determine whether or not it is the DR on the PIM interface based on a comparison of its DR priority with the increased DR priority value of the first PIM router. Assuming that the DR priority value of the second PIM router is determined to be less than the increased DR priority value of the first PIM router, the second PIM router will set itself as a non-DR router.

4.3 EXAMPLE APPARATUS

Figure 4:
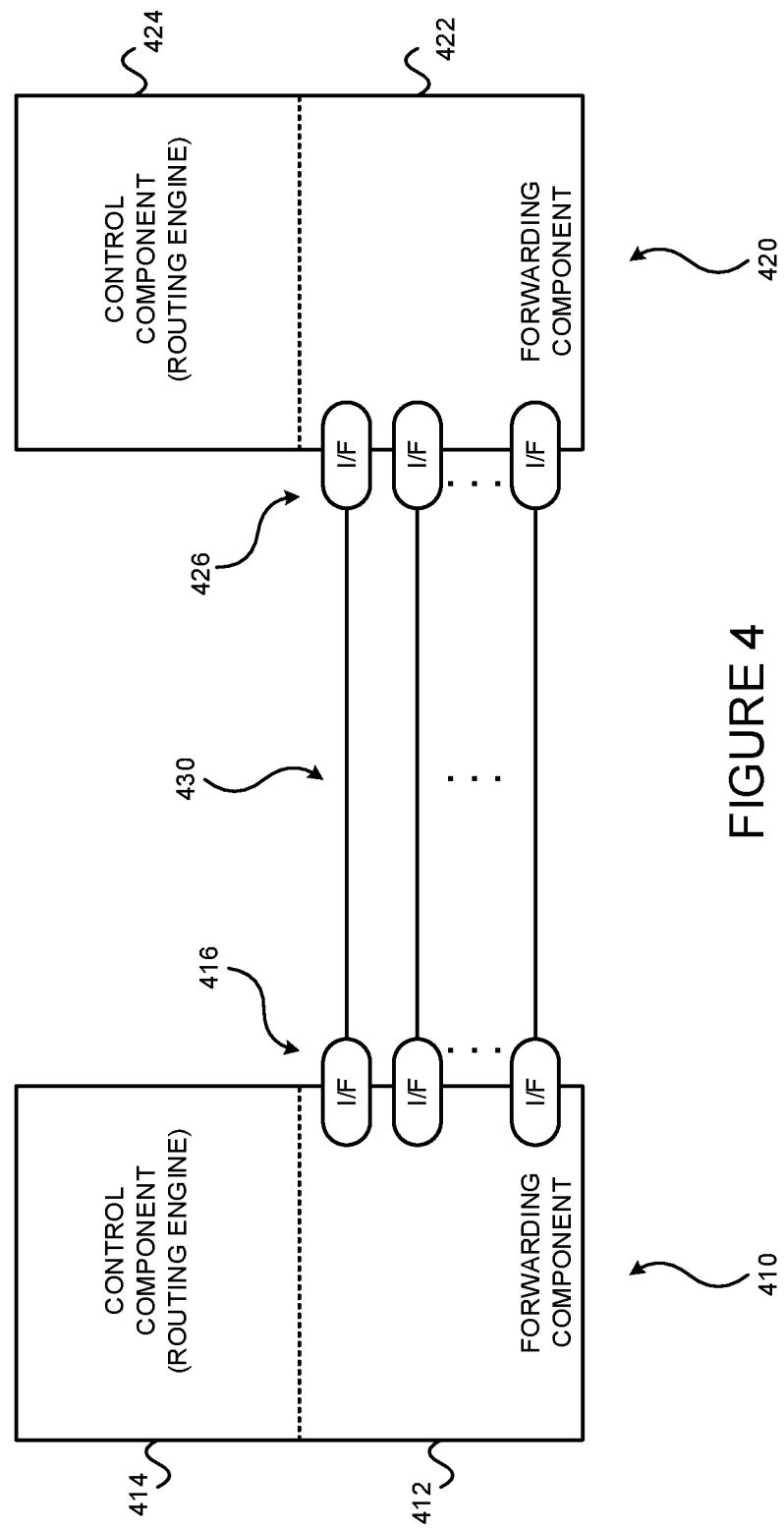
FIG. 4 illustrates an example environment including two systems coupled via communications links.

FIG. 4 illustrates two data forwarding systems 410 and 420 coupled via communications links 430. The links may be physical links or "wireless" links. The data forwarding systems 410,420 may be nodes, such as routers for example. If the data forwarding systems 410,420 are example routers, each may include a control component (e.g., a routing engine) 414,424 and a forwarding component 412,422. Each data forwarding system 410,420 includes one or more interfaces 416,426 that terminate one or more communications links 430. The PIM router may be implemented on device 410 and/or 420. The example method 300 described above may be implemented in the control component 414 and/or 424 of device 410 and/or 420.

As just discussed above, and referring to FIG. 5, some example routers 500 include a control component (e.g., routing engine) 510 and a packet forwarding component (e.g., a packet forwarding engine) 590.

The control component 510 may include an operating system (OS) kernel 520, routing protocol process(es) 530, label-based forwarding protocol process(es) 540, interface process(es) 550, user interface (e.g., command line interface) process(es) 560, and chassis process(es) 570, and may store routing table(s) 539, label forwarding information 545, and forwarding (e.g., route-based and/or label-based) table(s) 580. As shown, the routing protocol process(es) 530 may support routing protocols such as the routing information protocol ("RIP") 531, the intermediate system-to-intermediate system protocol ("IS-IS") 532, the open shortest path first protocol ("OSPF") 533, the enhanced interior gateway routing protocol ("EIGRP") 534 and the border gateway protocol ("BGP") 535, and the label-based forwarding protocol process(es) 540 may support protocols such as BGP 535, the label distribution protocol ("LDP") 536 and the resource reservation protocol ("RSVP") 537. The routing protocol process(es) 530 may implement the example method 300 of FIG. 3. One or more components (not shown) may permit a user 565 to interact with the user interface process(es) 560. Similarly, one or more components (not shown) may permit an outside device to interact with one or more of the router protocol process(es) 530, the label-based forwarding protocol process(es) 540, the interface process(es) 550, and the chassis process(es) 570, via SNMP 585, and such processes may send information to an outside device via SNMP 585.

The packet forwarding component 590 may include a microkernel 592, interface process(es) 593, distributed ASICs 594, chassis process(es) 595 and forwarding (e.g., route-based and/or label-based) table(s) 596.

Figure 5:
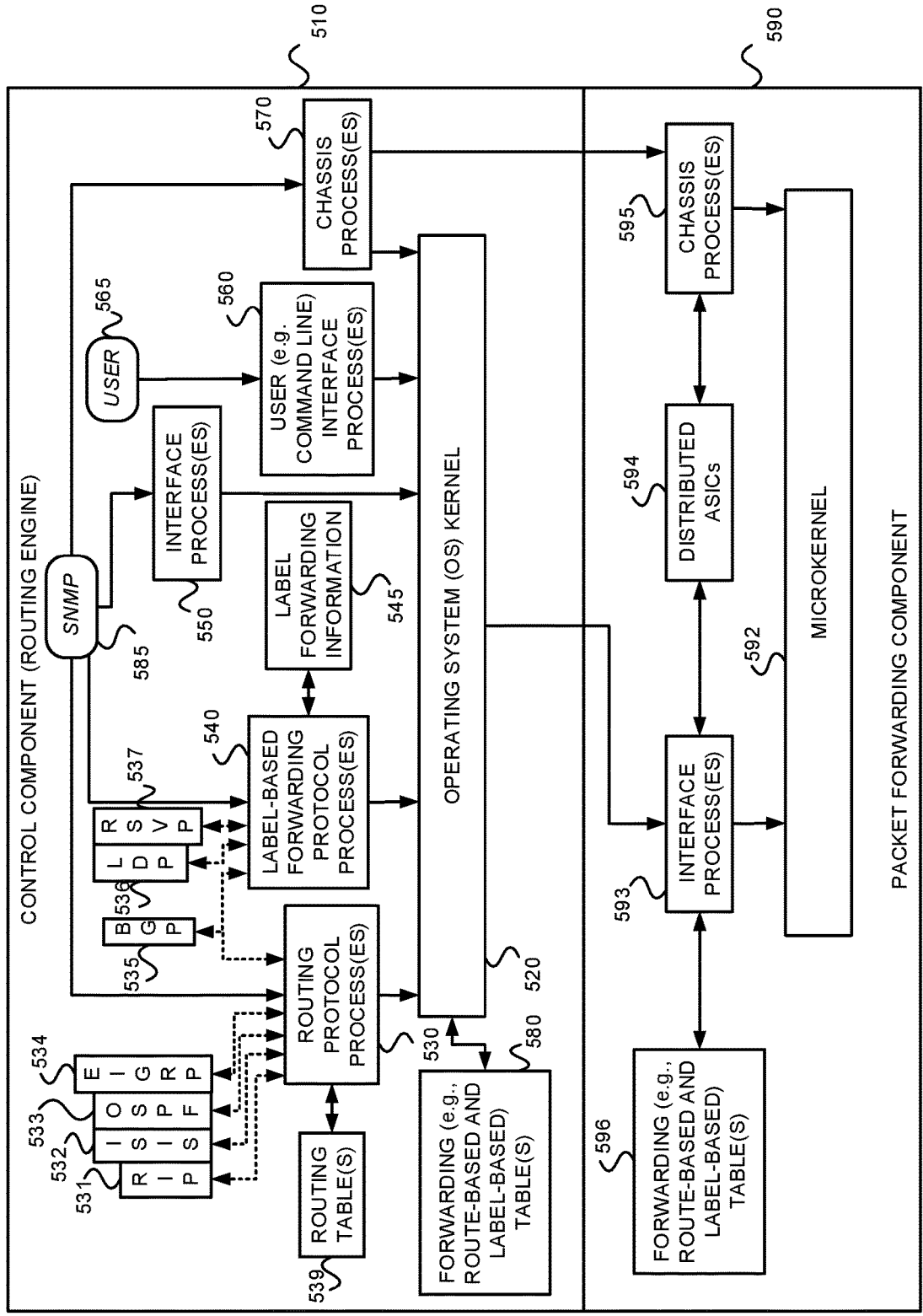
FIG. 5 is a block diagram of an example router on which the example methods of the present description may be implemented.

In the example router 500 of FIG. 5, the control component 510 handles tasks such as performing routing protocols, performing label-based forwarding protocols, control packet processing, etc., which frees the packet forwarding component 590 to forward received packets quickly. That is, received control packets (e.g., routing protocol packets and/or label-based forwarding protocol packets) are not fully processed on the packet forwarding component 590 itself, but are passed to the control component 510, thereby reducing the amount of work that the packet forwarding component 590 has to do and freeing it to process packets to be forwarded efficiently. Thus, the control component 510 is primarily responsible for running routing protocols and/or label-based forwarding protocols, maintaining the routing tables and/or label forwarding information, sending forwarding table updates to the packet forwarding component 590, and performing system management. The example control component 510 may handle routing protocol packets, provide a management interface, provide configuration management, perform accounting, and provide alarms. The processes 530, 540, 550, 560 and 570 may be modular, and may interact with the OS kernel 520. That is, nearly all of the processes communicate directly with the OS kernel 520. Using modular software that cleanly separates processes from each other isolates problems of a given process so that such problems do not impact other processes that may be running. Additionally, using modular software facilitates easier scaling.

Still referring to FIG. 5, the example OS kernel 520 may incorporate an application programming interface ("API") system for external program calls and scripting capabilities. The control component 510 may be based on an Intel PCI platform running the OS from flash memory, with an alternate copy stored on the router's hard disk. The OS kernel 520 is layered on the Intel PCI platform and establishes communication between the Intel PCI platform and processes of the control component 510. The OS kernel 520 also ensures that the forwarding tables 596 in use by the packet forwarding component 590 are in sync with those 580 in the control component 510. Thus, in addition to providing the underlying infrastructure to control component 510 software processes, the OS kernel 520 also provides a link between the control component 510 and the packet forwarding component 590.

Referring to the routing protocol process(es) 530 of FIG. 5, this process(es) 530 provides routing and routing control functions within the platform. In this example, the RIP 531, ISIS 532, OSPF 533 and EIGRP 534 (and BGP 535) protocols are provided. Naturally, other routing protocols (such as that described in RFC 4601 and in the example method 300 of FIG. 3) may be provided in addition, or alternatively. Similarly, the label-based forwarding protocol process(es) 540 provides label forwarding and label control functions. In this example, the LDP 536 and RSVP 537 (and BGP 535) protocols are provided. Naturally, other label-based forwarding protocols (e.g., MPLS) may be provided in addition, or alternatively. In the example router 500, the routing table(s) 539 is produced by the routing protocol process(es) 530, while the label forwarding information 545 is produced by the label-based forwarding protocol process(es) 540.

Still referring to FIG. 5, the interface process(es) 550 performs configuration of the physical interfaces (Recall, e.g., 516 and 526 of FIG. 5.) and encapsulation.

The example control component 510 may provide several ways to manage the router (e.g., for configuring the interval as discussed with reference to block 305 of FIG. 3). For example, it 510 may provide a user interface process(es) 560 which allows a system operator 565 to interact with the system through configuration, modifications, and monitoring. The SNMP 585 allows SNMP-capable systems to communicate with the router platform. This also allows the platform to provide necessary SNMP information to external agents. For example, the SNMP 585 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 510, thereby avoiding slowing traffic forwarding by the packet forwarding component 590.

Although not shown, the example router 500 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 560 via a console port, an auxiliary port, and/or a management Ethernet port. As noted, the interval may be configured using the CLI.

The packet forwarding component 590 is responsible for properly outputting received packets as quickly as possible. If there is no entry in the forwarding table for a given destination or a given label and the packet forwarding component 590 cannot perform forwarding by itself, it 590 may send the packets bound for that unknown destination off to the control component 510 for processing. The example packet forwarding component 590 is designed to perform Layer 2 and Layer 3 switching, route lookups, and rapid packet forwarding.

As shown in FIG. 5, the example packet forwarding component 590 has an embedded microkernel 592, interface process(es) 593, distributed ASICs 594, and chassis process(es) 595, and stores a forwarding (e.g., route-based and/or label-based) table(s) 596. The microkernel 592 interacts with the interface process(es) 593 and the chassis process(es) 595 to monitor and control these functions. The interface process(es) 592 has direct communication with the OS kernel 520 of the control component 510. This communication includes forwarding exception packets and control packets to the control component 510, receiving packets to be forwarded, receiving forwarding table updates, providing information about the health of the packet forwarding component 590 to the control component 510, and permitting configuration of the interfaces from the user interface (e.g., CLI) process(es) 560 of the control component 510. The stored forwarding table(s) 596 is static until a new one is received from the control component 510. The interface process(es) 593 uses the forwarding table(s) 596 to look up next-hop information. The interface process(es) 593 also has direct communication with the distributed ASICs 594. Finally, the chassis process(es) 595 may communicate directly with the microkernel 592 and with the distributed ASICs 594.

In the example router 500, the example method 300 consistent with the present disclosure may be implemented in the control component 510, and more specifically, in the routing protocol process(es) 530 and the CLI process(es) 560.

Figure 6:
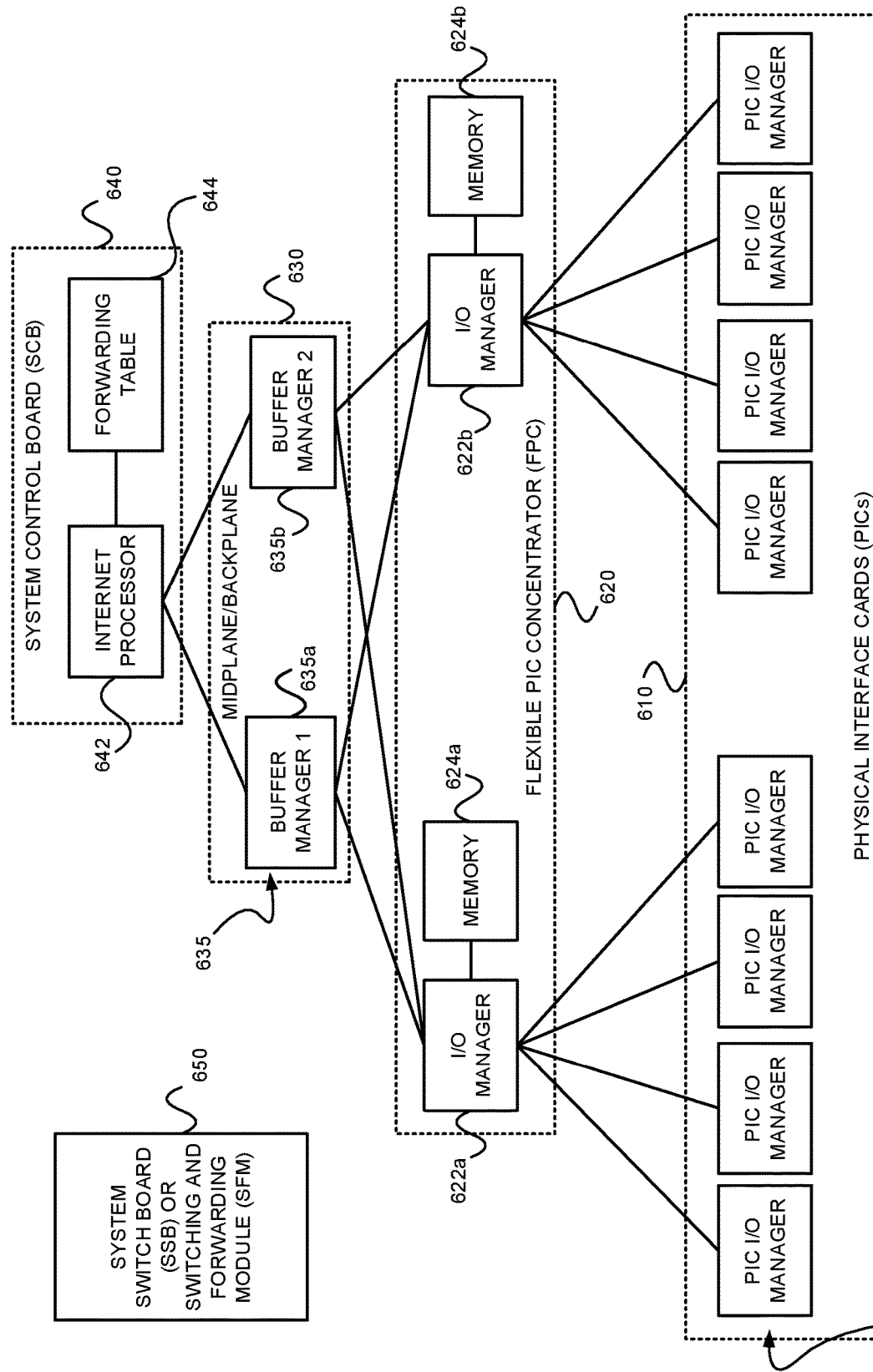
FIG. 6 is a block diagram of example distributed application specific integrated circuits ("ASICs") that may be provided in the example router of FIG. 5.

Referring back to distributed ASICs 594 of FIG. 5, FIG. 6 is an example of how the ASICS may be distributed in the packet forwarding component 590 to divide the responsibility of packet forwarding. As shown in FIG. 6, the ASICs of the packet forwarding component 590 may be distributed on physical interface cards ("PICs") 610, flexible PIC concentrators ("FPCs") 620, a midplane or backplane 630, and a system control board(s) 640 (for switching and/or forwarding). Switching fabric is also shown as a system switch board ("SSB"), or a switching and forwarding module ("SFM") 650. Each of the PICs 610 includes one or more PIC I/O managers 615. Each of the FPCs 620 includes one or more I/O managers 622, each with an associated memory 624. The midplane/backplane 630 includes buffer managers 635a, 635b. Finally, the system control board 640 includes an Internet processor 642 and an instance of the forwarding table 644 (Recall, e.g., 596 of FIG. 5).

Still referring to FIG. 6, the PICs 610 contain the interface ports. Each PIC 610 may be plugged into an FPC 620. Each individual PIC 610 may contain an ASIC that handles media-specific functions, such as framing or encapsulation. Some example PICs 610 provide SDH/SONET, ATM, Gigabit Ethernet, Fast Ethernet, and/or DS3/E3 interface ports.

An FPC 620 can contain from one or more PICs 610, and may carry the signals from the PICs 610 to the midplane/backplane 630 as shown in FIG. 6.

The midplane/backplane 630 holds the line cards. The line cards may connect into the midplane/backplane 630 when inserted into the example router's chassis from the front. The control component (e.g., routing engine) 510 may plug into the rear of the midplane/backplane 630 from the rear of the chassis. The midplane/backplane 630 may carry electrical (or optical) signals and power to each line card and to the control component 510.

The system control board 640 may perform forwarding lookup. It 640 may also communicate errors to the routing engine. Further, it 640 may also monitor the condition of the router based on information it receives from sensors. If an abnormal condition is detected, the system control board 640 may immediately notify the control component 510.

Referring to FIGS. 6, 7A and 7B, in some exemplary routers, each of the PICs 610,510' contains at least one I/O manager ASIC 615 responsible for media-specific tasks, such as encapsulation. The packets pass through these I/O ASICs on their way into and out of the router. The I/O manager ASIC 615 on the PIC 610,510' is responsible for managing the connection to the I/O manager ASIC 622 on the FPC 620,520', managing link-layer framing and creating the bit stream, performing cyclical redundancy checks (CRCs), and detecting link-layer errors and generating alarms, when appropriate. The FPC 620 includes another I/O manager ASIC 622. This ASIC 622 takes the packets from the PICs 610 and breaks them into (e.g., 64-byte) memory blocks. This FPC I/O manager ASIC 622 sends the blocks to a first distributed buffer manager (DBM) 635a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 635a' manages and writes packets to the shared memory 624 across all FPCs 620. In parallel, the first DBM ASIC 635a' also extracts information on the destination of the packet and passes this forwarding-related information to the Internet processor 642/542'. The Internet processor 642/542' performs the route lookup using the forwarding table 644 and sends the information over to a second DBM ASIC 635b'. The Internet processor ASIC 642/542' also collects exception packets (i.e., those without a forwarding table entry) and sends them to the control component 510. The second DBM ASIC 635b' then takes this information and the 64-byte blocks and forwards them to the I/O manager ASIC 622 of the egress FPC 620/520' (or multiple egress FPCs, in the case of multicast) for reassembly. (Thus, the DBM ASICs 635a' and 635b' are responsible for managing the packet memory 624 distributed across all FPCs 620/520', extracting forwarding-related information from packets, and instructing the FPC where to forward packets.)

The I/O manager ASIC 622 on the egress FPC 620/520' may perform some value-added services. In addition to incrementing time to live ("TTL") values and re-encapsulating the packet for handling by the PIC 610, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 622 on the egress FPC 620/520' may be responsible for receiving the blocks from the second DBM ASIC 635b', incrementing TTL values, queuing a pointer to the packet, if necessary, before applying CoS rules, re-encapsulating the blocks, and sending the encapsulated packets to the PIC I/O manager ASIC 615.

Figure 8:
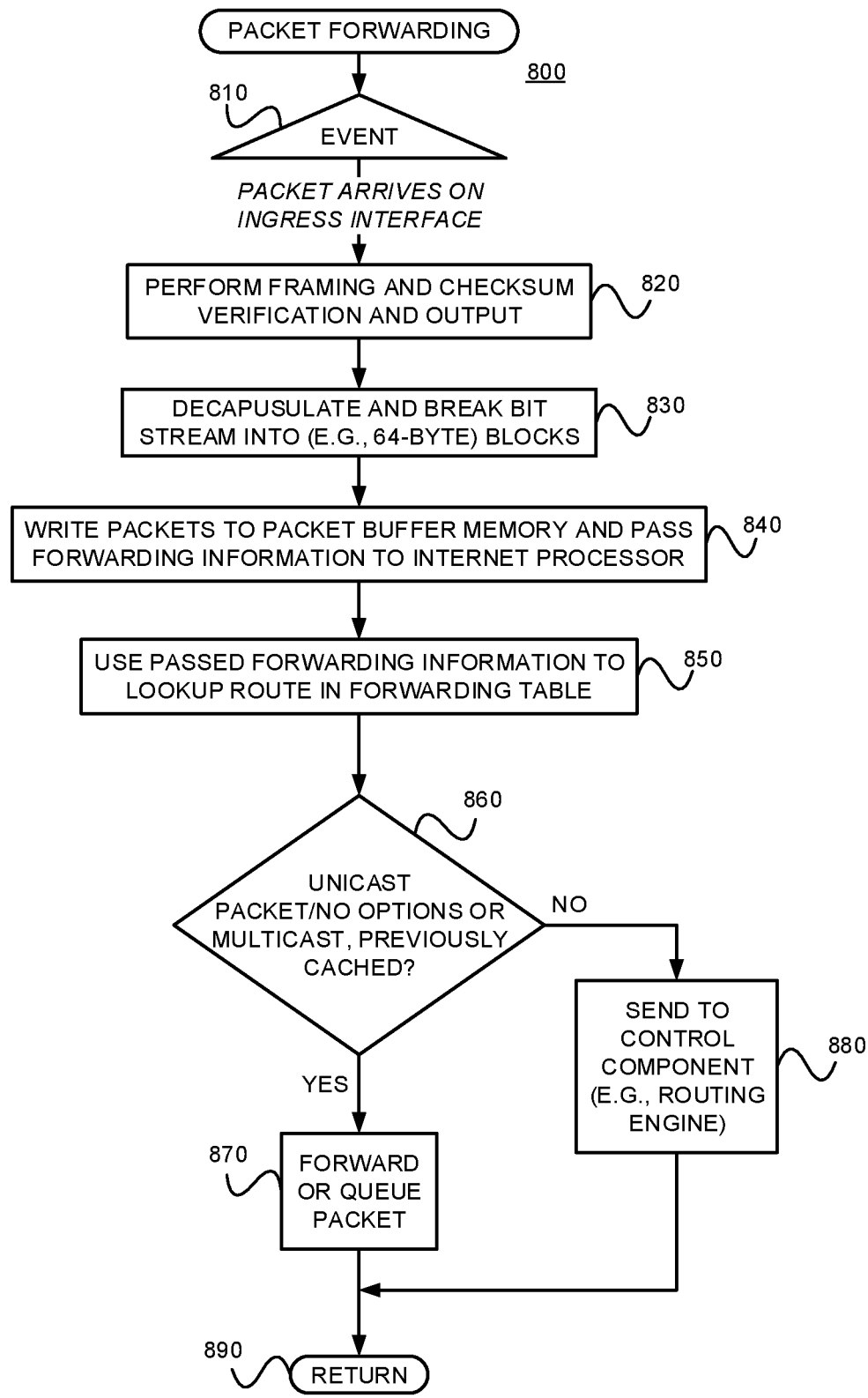
FIG. 8 is a flow diagram of an example packet forwarding method that may be implemented on any of the example routers of FIGS. 5 and 6.

FIG. 8 is a flow diagram of an example method 800 for providing packet forwarding in the example router. The main acts of the method 800 are triggered when a packet is received on an ingress (incoming) port or interface. (Event 810) The types of checksum and frame checks that are required by the type of medium it serves are performed and the packet is output, as a serial bit stream. (Block 820) The packet is then decapsulated and parsed into (e.g., 64-byte) blocks. (Block 830) The packets are written to buffer memory and the forwarding information is passed on the Internet processor. (Block 840) The passed forwarding information is then used to lookup a route in the forwarding table. (Block 850) (Recall, e.g., FIGS. 6A-6D.) Note that the forwarding table can typically handle unicast packets that do not have options (e.g., accounting) set, and multicast packets for which it already has a cached entry. Thus, if it is determined that these conditions are met (YES branch of Decision 860), the packet forwarding component finds the next hop and egress interface, and the packet is forwarded (or queued for forwarding) to the next hop via the egress interface (Block 870) before the method 800 is left (Node 890) Otherwise, if these conditions are not met (NO branch of Decision 860), the forwarding information is sent to the control component 510 for advanced forwarding resolution (Block 880) before the method 800 is left (Node 890).

Referring back to block 870, the packet may be queued. Actually, as stated earlier with reference to FIG. 6, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 622 may send a request for the packet to the second DBM ASIC 635b. The DBM ASIC 635 reads the blocks from shared memory and sends them to the I/O manager ASIC 622 on the FPC 620, which then serializes the bits and sends them to the media-specific ASIC of the egress interface. The I/O manager ASIC 615 on the egress PIC 610 may apply the physical-layer framing, perform the CRC, and send the bit stream out over the link.

Referring back to block 880 of FIG. 8, as well as FIG. 6, regarding the transfer of control and exception packets, the system control board 640 handles nearly all exception packets. For example, the system control board 640 may pass exception packets to the control component 510.

Although example embodiments consistent with the present disclosure may be implemented on the example routers of FIG. 4 or 5, embodiments consistent with the present disclosure may be implemented on communications network nodes (e.g., routers, switches, etc.) having different architectures. For example, methods consistent with the present description may be run on any modern server, or even a virtual machine (e.g., without any ASICs or packet forwarding engines). More generally, embodiments consistent with the present disclosure may be implemented on an example system 900 as illustrated on FIG. 9.

Figure 9:
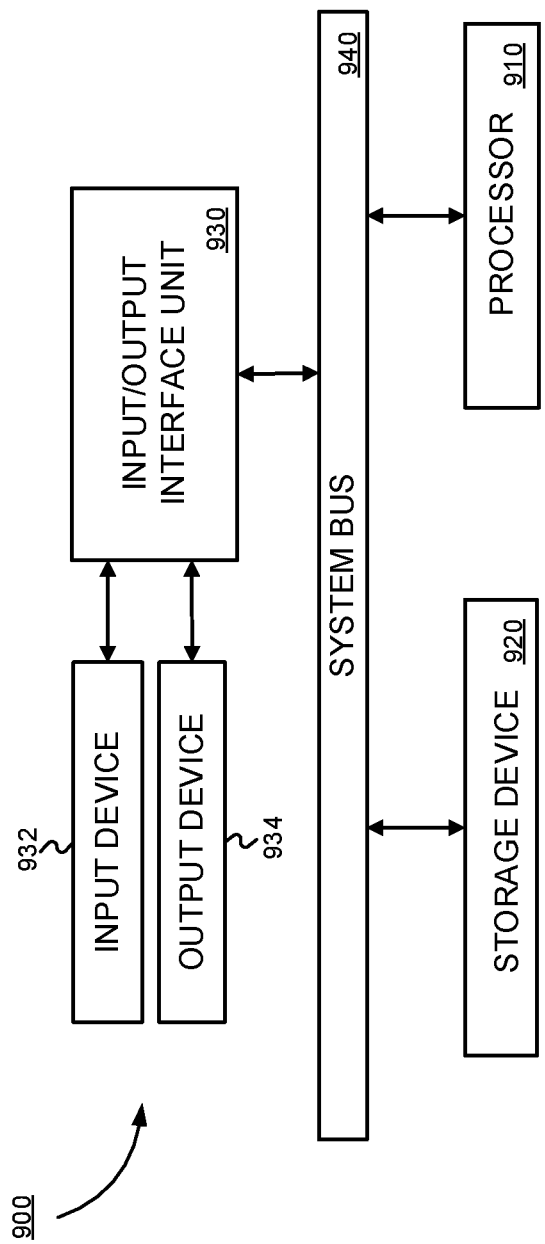
FIG. 9 is a block diagram of an example processor-based system that may be used to execute the example methods and/or to store information used and/or generated by such example methods.

FIG. 9 is a block diagram of an exemplary machine 900 that may perform one or more of the methods described, and/or store information used and/or generated by such methods. The exemplary machine 900 includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930. The one or more processors 910 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 920 and/or may be received from an external source via one or more input interface units 930. The machine executable instructions may be stored as various software modules, each module performing one or more operations. Functional software modules are examples of components, which may be used in the apparatus described.

In some embodiments consistent with the present disclosure, the processors 910 may be one or more microprocessors and/or ASICs. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program, which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

4.4 EXAMPLE OF OPERATIONS

Figure 2B:
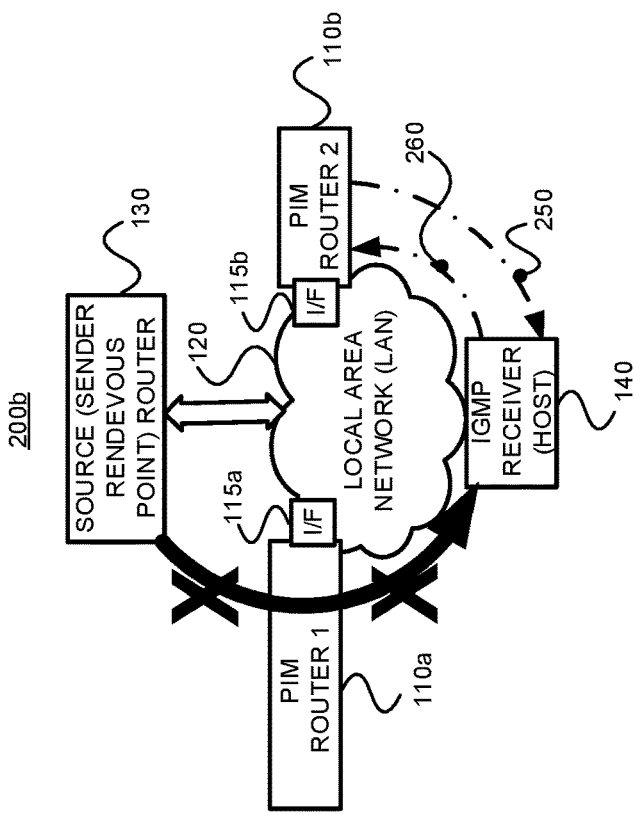
FIGS. 2A and 2B illustrate the problem of traffic loss in the example environment of FIG. 1.
Figure 2A:
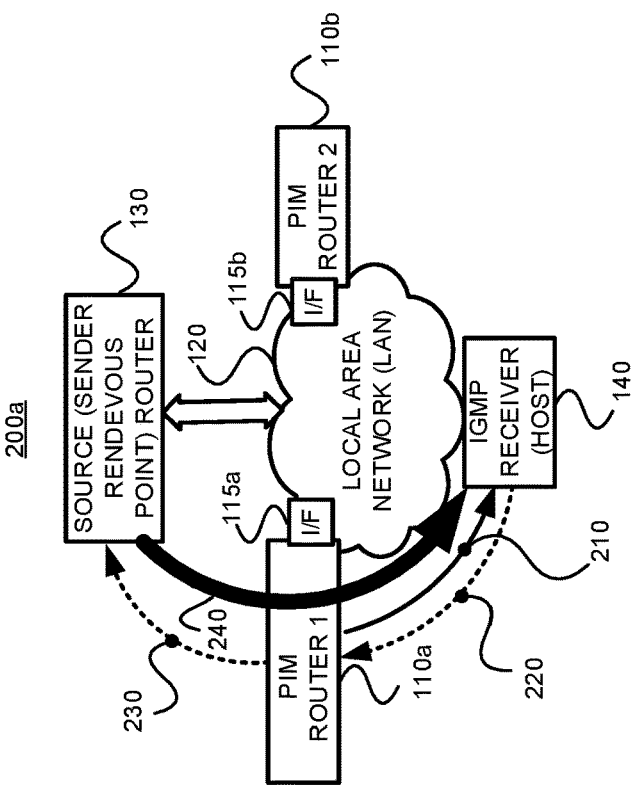

4.4.1 Example of Operations in a Scenario in which One PIM Router Comes Up Well Before the Other PIM Router Referring back to the example topology 200a of FIG. 2A, assume the new CLI knob dr-stickydr <interval> is configured under PIM interface ge-0/0/1.0 115a/115b on both RIM router 1 110a and PIM router 2 110b. (Recall, e.g., 305 of FIG. 3.) Assume further that PIM router 1 110a comes up first on the LAN 120. PIM router 1 110a starts a timer "T" of <interval> secs, as configured for dr-stickydr knob, when PIM interface ge-0/0/1.0 comes up for the first time. (Recall, e.g., 325 of FIG. 3.) PIM router 1 110a starts DR election as per RFC 4601 section 4.3.2. (Recall, e.g., 330 of FIG. 3.) After expiry of the time "T," PIM router 1 110a checks if it is still DR on interface ge-0/0/1.0. (Recall, e.g., 370 of FIG. 3.) If YES (in which case, PIM router 1 110a will still remain DR), PIM router 1 110A transitions from DR to sticky DR by increasing its DR priority (e.g., to MAX (0xfffffffe)) (Recall, e.g., 380 of FIG. 3.) and sends out a PIM HELLO (Recall, e.g., 385 of FIG. 3.). PIM router 1 110a receives an IGMP join (Recall, e.g., 340 of FIG. 3.), forms PIM states (Recall, e.g., 345 of FIG. 3.), sends a PIM join upstream (Recall, e.g., 350 of FIG. 3.) and adds multicast routes once traffic hits PIM router 1 110a. (Recall, e.g., 355 of FIG. 3.) Multicast traffic then flows from the source (sender rendezvous point) router 130 to PIM router 1 110a, and then from PIM router 1 110a to IGMP receiver (host) 140.

Next, assume that PIM router 2 110b comes up on LAN 120 after a considerable amount of time (that is, much more than the configured dr-stickydr <interval>). PIM router 2 110b also starts a timer with <interval> secs on bringing up of PIM interface ge-0/0/1.0. (Recall, e.g., 325 of FIG. 3.) PIM router 2 110b sends out PIM HELLO on LAN 120 per RFC 4601. (Recall, e.g., 320 of FIG. 3.). PIM router 1 110a sees this PIM HELLO and still remains the DR as it is a sticky DR and its increased DR priority is greater than that of PIM router 2 110b. Likewise, PIM router 2 110b receives PIM router 1 110a's PIM HELLO and elects itself as a non-DR (Recall, e.g., 360 of FIG. 3.) as PIM router 1 110a's DR priority is higher than that of PIM router 2 110b on ge-0/0/1.0. (For example, election is performed as per RFC 4601 section 4.3.2).

Upon timer expiry, PIM router 2 110b sees itself as non-DR on ge-0/0/1.0. (Recall, 370 of FIG. 3.) Accordingly, no operation takes place. (That is, the branch of FIG. 3 including 380 and 385 is not processed by PIM router 2 110b.) Consequently, PIM router 2 110b remains as a non-DR, even if its IP address is higher than that of PIM router 1 110a. Since multicast traffic continues to flow from the source (sender rendezvous point) router 130 to PIM router 1 110a, and then from PIM router 1 110a to IGMP receiver (host) 140, there is no traffic loss. In this scenario.

4.4.2 Example of Operations in a Scenario in which Two PIM Routers Come Up Roughly Simultaneously Under a second scenario, assume that both PIM routers—PIM router 1 110a and PIM router 2 110b—come up at the same time with new CLI knob configuration set on each of them. That is, assume that PIM router 1 110a and PIM router 2 110b come up on the LAN 120 simultaneously. PIM router 1 110a and PIM router 2 110b both start a timer "T" of <interval> secs, as configured for dr-stickydr knob, when PIM interface ge-0/0/1.0 115a/115b comes up for the first time on each of the two PIM routers. (Recall, e.g., 325 of FIG. 3.) PIM router 1 110a and PIM router 2 110b start DR election as per RFC 4601 section 4.3.2. (Recall, e.g., 320 of FIG. 3.) PIM router 2 110b becomes DR since it has a higher IP address than that of PIM router 1 110a. PIM router 1 110a becomes non-DR. (Recall, e.g., 330 of FIG. 3.) After expiry of "T," PIM router 2 110b determines whether it is still DR on interface ge-0/0/1.0. (Recall, e.g., 370 of FIG. 3.) Since PIM router 2 110b is still the DR after timer expiry, it transitions from DR to sticky DR by increasing its DR priority (e.g., to MAX (0xfffffffe)) (Recall, e.g., 380 of FIG. 3.) and sending out a PIM HELLO including the increased DR priority (Recall, e.g., 385 of FIG. 3.). On the other hand, at timer expiry, PIM router 1 110a still sees itself as non-DR on ge-0/0/1.0. Accordingly, no operation takes place. (That is, the branch of FIG. 3 including 380 and 385 is not processed by PIM router 1 110a.)

As shown by this scenario, if more than one DR router come up simultaneously, RFC 4601, without change, may be used to select the initial DR, but this should not be a problem since a multicast flow will likely not have been started (and interrupted).

4.5 REFINEMENTS, ALTERNATIVES AND EXTENSIONS

4.5.1 Overriding StikcyDR

It is possible to have a use case where a user wants to add a new device on the LAN and wants the newly added device to be a DR in the presence of stickyDR on the same LAN. It is also possible that a user wants an existing device on the LAN to override the stickyDR and become the DR. To address such possible scenarios, the increased DR priority of a stickyDR may be set to 0xfffffffe (or lower). In this way, there is still a room for configuring the highest DR priority 0xffffffff which, when configured on a PIM interface, can override PIM stickyDR of 0xfffffffe (or lower). For example, the user can first avoid configuring the new device or existing device with a dr-stickyDR knob. If a dr-stickyDR knob is already configured on an existing device, then the user can remove the configuration of stickyDR. The user can then configure the PIM PR priority as 0xffffffff on the interface for which they want to override the stickyDR.

4.5.2 Interval Values

Example embodiments consistent with the present description provide a CLI knob:

set protocols pim interface <interface> dr-stickydr <interval> set routing-instances <instance> protocols pim interface <interface> dr-stickydr <interval>

On configuring the foregoing CLI knob on a PIM interface, a newly coming up PIM interface is permitted to make itself a sticky DR (i.e., DR priority increased (e.g., to MAX value 0xfffffffe)) if the PIM router still remains a DR on the same PIM interface after the configured <interval> of secs. Referring back to 305 of FIG. 3, the first interval may be configured to a value ranging from 2 to 10 seconds. This range of time accounts for differences in the time needed to stabilize higher end routers (e.g., about 2 seconds) and lower end routers (e.g., about 10 seconds). A default interval of about 5 seconds may be used if a value is not set explicitly.

4.6 CONCLUSIONS

As should be apparent from the foregoing, example embodiments consistent with the present description avoid the loss of multicast traffic losses during an initial boot up scenario. Advantageously, the example embodiments are simple to implement. Since the example embodiments are interoperable with other PIM routers that don't implement this improvement, but rather, implement a PIM standard such as RFC 4601, there is no need to change the standard.

Example embodiments consistent with the present description extend PIM DR deployments to critical network topologies, such as those that deal with emergency lines, and treat traffic loss on a stable network as critical issue. Better PIM DR election on critical network topologies is important to entities deploying emergency lines, or deploying critical applications on a network that treat a minimal traffic loss in their stable network (traffic loss after a stable multicast traffic flow is created) as a very critical issue. In these scenarios, example embodiments consistent with the present description will make the DR election fault tolerant having zero traffic loss in a stable network.

Further, example embodiments consistent with the present description make fault tolerant PIM DR election more deterministic because the first PIM router to be selected as DR within <interval> secs will always be the DR (unless overridden manually).

Example embodiments consistent with the present description provide zero traffic loss where PIM interface IP addresses are allocated by DHCP and the PIM router having the PIM interface with the lower IP address comes up first in the network (and thus pulls traffic), and create a stable PIM states before a PIM router having a PIM interface with higher IP address comes up on the LAN.

Finally, example embodiments consistent with the present description provide a flexible solution and give the user/customer room to override the stickydr on the LAN interface.

What is claimed is:

1. A computer-implemented method for selecting as a designated router (DR), one of at least two protocol independent multicast (PIM) routers provided on a multi-access local area network (LAN) between a sender rendezvous point (RP) router and a multicast receiver, the computer-implemented method comprising:
a) configuring a first interval on a PIM interface for at least a first of the at least two PIM routers;
b) responsive to the PIM interface of the first PIM router booting up,
1) starting, by the first PIM router, a timer corresponding to the configured first interval,
2) determining, by the first PIM router, whether or not it is the DR on the PIM interface,
3) upon determining that the timer has expired, redetermining, by the first PIM router, whether or not it is the DR on the PIM interface, and
4) responsive to a redetermination that the first PIM router is the DR on the PIM interface,
A) increasing, by the first PIM router, a DR priority value of the first PIM router to reduce a likelihood that another of the at least two PIM routers will replace the first PIM router as DR, and
B) sending on the PIM interface, by the first PIM router, a PIM HELLO message including the increased DR priority value.

2. The computer-implemented method of claim 1 further comprising, responsive to a determination that the first PIM router is the DR of the PIM interface:
c) receiving, by the first PIM router, from a multicast receiver on a tree routed by the sender, an Internet Group Management Protocol (IGMP) join message;
d) forming, by the first PIM router, PIM states;
e) sending, by the first PIM router, a PIM join upstream to the sender; and
f) adding, by the first PIM router, multicast routes once traffic is received by the first PIM router.

3. The computer-implemented method of claim 1 further comprising:
c) responsive to a PIM interface of a second of the at least two PIM routers booting up, determining, by the second PIM router, whether or not it is the DR on the PIM interface.

4. The computer-implemented method of claim 3 wherein the second PIM router boots up before the timer has expired, and
wherein the determining, by the second PIM router, whether or not it is the DR on the PIM interface, uses at least one of (A) DR priority information of the second PIM router, and (B) the Internet address of the second PIM router, and
e) responsive to a determination by the second PIM router that it is the DR on the PIM interface,
sending, on the PIM interface, a PIM HELLO message indicating that the second PIM router is selected as the DR on the PIM interface, and
otherwise, responsive to a determination by the second PIM router that it is not the DR on the PIM interface, sending a PIM HELLO message indicating that the second PIM router is a non-DR on the PIM interface.

5. The computer-implemented method of claim 4 wherein, responsive to the second PIM router determining that it is the DR on the PIM interface, further
receiving by the first PIM router, the message indicating that the second PIM router is the DR on the PIM interface, and
determining whether or not the message was received by the first PIM router before expiration of the timer, and
responsive to a determination that the message was received by the first PIM router before expiration of the timer, determining by the first PIM router that is it a non-DR on the PIM interface.

6. The computer-implemented method of claim 3 wherein the second PIM router boots up after the timer has expired and the after the first PIM router has sent a PIM HELLO message including the increased DR priority value, and
wherein the determining, by the second PIM router, whether or not it is the DR on the PIM interface, compares a DR priority of the second PIM router with the increased DR priority value of the first PIM router.

7. The computer-implemented method of claim 6 wherein the DR priority value of the second PIM router is determined to be less than the increased DR priority value of the first PIM router, the computer-implemented method further comprising:
setting, by the second PIM router, itself as a non-DR router.

8. The computer-implemented method of claim 1 wherein the increased DR priority value is less than a maximum DR priority value, and
wherein a second of the at least two PIM routers has been configured with a DR priority value greater than the increased DR priority value of the first PIM router.

9. The computer-implemented method of claim 1 wherein the first interval is configured to a value ranging from 2 to 10 seconds.

10. The computer-implemented method of claim 1 wherein responsive to the PIM interface of the first PIM router booting up, further sending a PIM HELLO message including the initial DR priority value of the first PIM router.

11. A protocol independent multicast (PIM) router for use on a multi-access local area network (LAN) between a sender rendezvous point (RP) router and a multicast receiver, the PIM router comprising:
a) a storage device storing processor-executable instructions and a configurable first interval;
b) at least one processor which, when executing the processor-executable instructions,
  1) responsive to a PIM interface of the PIM router booting up,
    A) starts a timer corresponding to the configured first interval,
    B) determines whether or not the PIM router is the DR on the PIM interface,
    C) upon determining that the timer has expired, redetermines whether or not the PIM router is the DR on the PIM interface, and
    D) responsive to a redetermination that the PIM router is the DR on the PIM interface,
      A) increases a DR priority value of the PIM router to reduce a likelihood that another PIM router on the LAN will replace the PIM router as DR, and
      B) sends a PIM HELLO message including the increased DR priority value.

12. The PIM router of claim 11 wherein the at least one processor, when executing the processor-executable instructions and responsive to a determination that the PIM router is the DR of the PIM interface, further
receives from a multicast receiver on a tree routed by the sender, an Internet Group Management Protocol (IGMP) join message,
forms PIM states,
sends a PIM join upstream to the sender, and
adds multicast routes once traffic is received by the PIM router.

13. The PIM router of claim 11 wherein the increased DR priority value is less than a maximum DR priority value.

14. The PIM router of claim 13 wherein another PIM router on the same LAN as the PIM router has been configured with a DR priority value greater than the increased DR priority value of the PIM router.

15. The PIM router of claim 11 wherein the first interval is configured to a value ranging from 2 to 10 seconds.

16. A non-transitory computer-readable medium storing a configured first interval for a PIM interface of a PIM router, and computer-executable instructions which, when executed by a least one processor, cause the at least one processor to perform a method for selecting as a designated router (DR), one of at least two protocol independent multicast (PIM) routers provided on a multi-access local area network (LAN) between a sender rendezvous point (RP) router and a multicast receiver, the computer-implemented method comprising:
a) responsive to the PIM interface of a first of the at least two PIM routers booting up,
  1) starting, by the first PIM router, a timer corresponding to the configured first interval,
  2) determining, by the first PIM router, whether or not it is the DR on the PIM interface,
  3) upon determining that the timer has expired, redetermining, by the first PIM router, whether or not it is the DR on the PIM interface, and
  4) responsive to a redetermination that the first PIM router is the DR on the PIM interface,
    A) increasing, by the first PIM router, a DR priority value of the first PIM router to reduce a likelihood that another of the at least two PIM routers will replace the first PIM router as DR, and
    B) sending on the PIM interface, by the first PIM router, a PIM HELLO message including the increased DR priority value.

17. The non-transitory computer-readable medium of claim 16 wherein the method further includes, responsive to a determination that the first PIM router is the DR of the PIM interface:
b) receiving, by the first PIM router, from a multicast receiver on a tree routed by the sender, an Internet Group Management Protocol (IGMP) join message;
c) forming, by the first PIM router, PIM states;
d) sending, by the first PIM router, a PIM join upstream to the sender; and
e) adding, by the first PIM router, multicast routes once traffic is received by the first PIM router.

18. The non-transitory computer-readable medium of claim 16 wherein the increased DR priority value is less than a maximum DR priority value.

19. The non-transitory computer-readable medium of claim 16 wherein the first interval is configured to a value ranging from 2 to 10 seconds.

* * * * *